United States Patent [19]

Renouard et al.

[11] Patent Number: 5,090,761
[45] Date of Patent: Feb. 25, 1992

[54] TRAILER FOR ELONGATED, GENERALLY FLAT OBJECTS

[75] Inventors: Bruce T. Renouard; Gary R. Hochstatter, both of Dallas, Tex.

[73] Assignee: Pack Rat Products, Inc., Dallas, Tex.

[21] Appl. No.: 629,459

[22] Filed: Dec. 18, 1990

[51] Int. Cl.⁵ .............................................. B60P 3/00
[52] U.S. Cl. .............................................. 296/3; 410/2
[58] Field of Search ............... 296/3, 6; 211/60.1, 211/13; 410/31, 32, 36, 37

[56] References Cited

U.S. PATENT DOCUMENTS 4,626,017 12/1986 Robertson ............................ 296/3
4,770,577 9/1988 Farris ................................... 296/3

FOREIGN PATENT DOCUMENTS 262633 9/1964 Australia ............................... 296/3

*Primary Examiner*—Robert R. Song
*Attorney, Agent, or Firm*—Daniel V. Thompson

[57] ABSTRACT

A trailer for elongated, generally flat objects, such as sailboards, includes trailer base having at least two wheels, and a superstructure above the base, the superstructure having a plurality of members constructed and arranged to support horizontally at least one of the objects.

9 Claims, 2 Drawing Sheets

TRAILER FOR ELONGATED, GENERALLY FLAT OBJECTS

TECHNICAL FIELD

This invention relates to trailers, and more particularly to a trailer for elongated, generally flat objects, such as sailboards.

BACKGROUND ART

Sailboarding is a recreational activity that is gaining in popularity. Unfortunately, the equipment used to participate in this activity is elongated and bulky, making transportation difficult when more than one sailboard is to be transported. Conventional trailers cannot be used to transport sailboards, because of their unique configuration and fragile nature.

SUMMARY OF THE INVENTION

The present invention is a trailer for elongated, generally flat objects, such as sailboards, wherein a trailer base has at least two wheels. A superstructure above the base has a plurality of members constructed and arranged to support horizontally at least one of the objects. In a specific aspect of the invention, the superstructure members include forward and aft pairs of upright members spaced at the lower ends and crossing above the lower ends to form open triangles with a trailer frame Support arms extend from the upright members to hold the objects, and preferably the upright members have portions which extend above crosspoints to support additional objects.

BRIEF DESCRIPTION OF THE DRAWINGS

A more complete understanding of the invention and its advantages will be apparent from the Detailed Description taken in conjunction with the accompanying Drawings in which.

DETAILED DESCRIPTION OF THE PREFERRED EMBODIMENT

Figure 1:
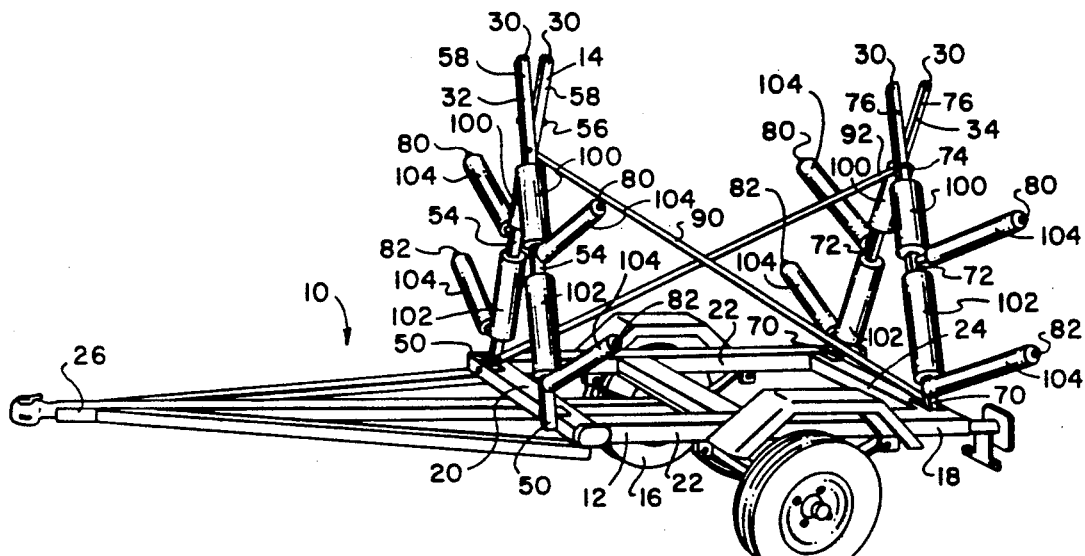
FIG. 1 is a perspective view of a trailer constructed in accordance with the invention.
Figure 2:
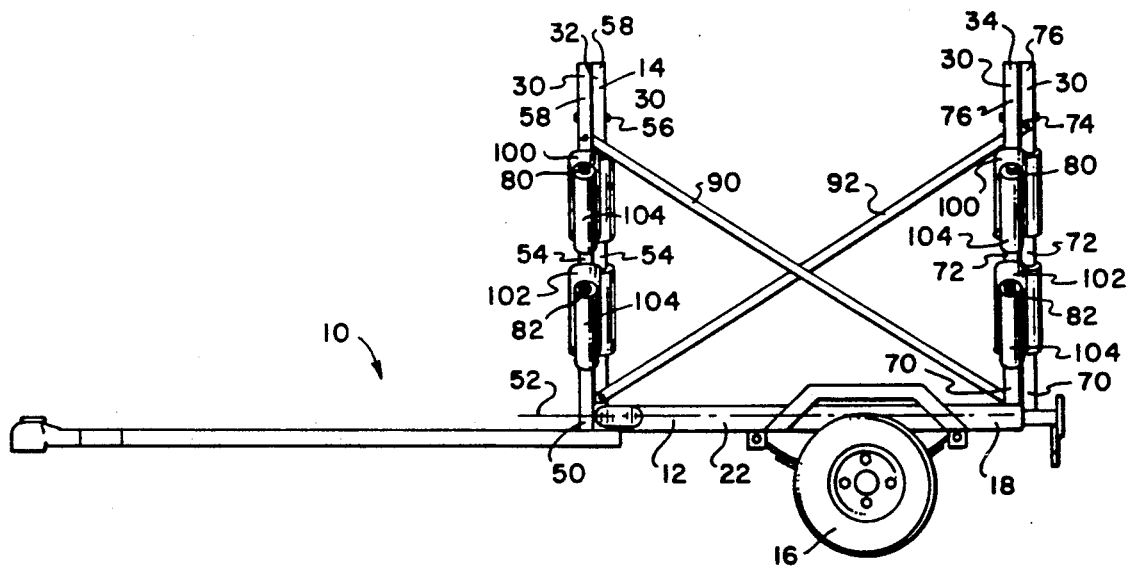
FIG. 2 is a side view of the trailer of FIG. 1.
Figure 3:
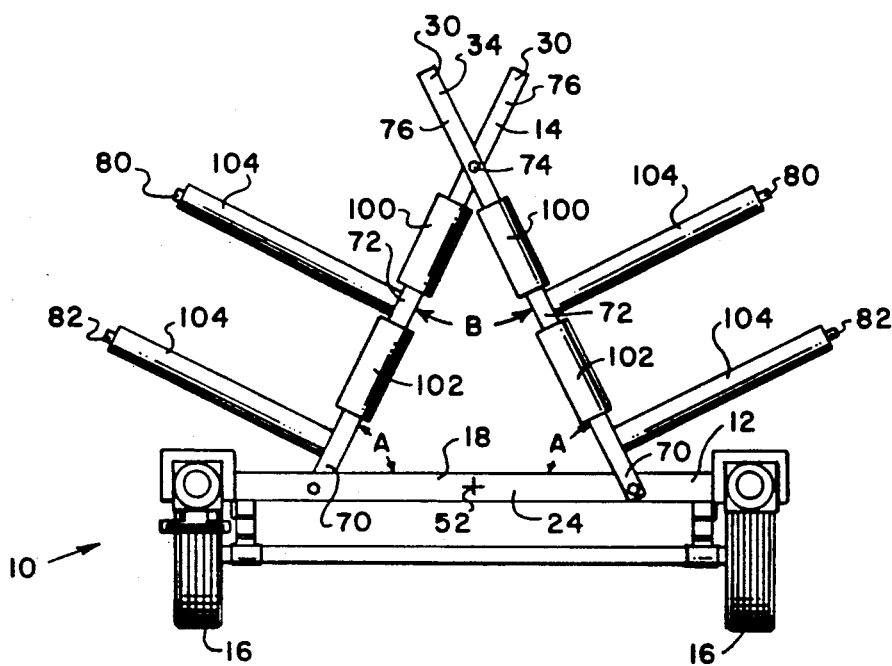
FIG. 3 is an end view of the trailer.

Referring initially to FIGS. 1, 2 and 3, where like numerals indicate like and corresponding elements, trailer 10 includes a trailer base 12 and a superstructure 14. Trailer base 12 has at least two wheels 16 attached to a rectangular, planar frame 18. Frame 18 includes a front frame member 20, two spaced side frame members 22 and a rear frame member 24. A tongue 26 extends forwardly from front frame member 20. Wheels 16 are located vertically below side frame members 22 and horizontally approximately midway between the front and rear frame members 20 and 24, respectively.

Superstructure 14 is located above frame 18. Superstructure 14 includes forward and aft pairs of linear, tubular, substantially identical upright members 30. Preferably upright member 30 have square cross-sections. The forward pair 32 of upright members 30 forms an open, substantially isosceles triangle with front frame member 20 when viewed from the front or rear of trailer 10, as best shown in FIG. 3. The triangle has base angles A of approximately 65° and an apex angle B of approximately 55°. Aft pair 34 of upright members 30 forms an open triangle with rear frame member 24 substantially congruent with the triangle formed by forward pair 32 and front frame member 20 (see FIG. 3). As best shown in FIG. 2, upright members 30 extend at right angles to side frame members 22 when viewed from the sides of trailer 10. Lower ends 50 of forward pair 32 of upright members 30 are connected to front frame member 20 at spaced locations thereon located substantially equal distances from a center line 52 (FIG. 3) of rectangular frame 12. Lower portions 54 of forward pair 32 of upright members 30 extend inwardly and upwardly from front frame member 12, with the forward pair 32 of upright members 30 crossing and being interconnected as a forward crosspoint 56. Forward crosspoint 56 is located substantially directly above centerline 52 of frame 12. Upper portions 58 of forward pair 32 of upright members 30 extend outwardly and upwardly from forward crosspoint 56 to form a "V". As best shown in FIG. 3, lower and upper portions 54 and 58, respectively, of forward pair 32 of upright members 30 have a length ratio of approximately 3:1, such that the lower portions are three times longer than the upper portions.

Aft pair 34 of upright members 30 is constructed substantially identically to the forward pair 32 of upright members 30, having lower ends 70, lower portions 72, aft crosspoint 74 and upper portions 76.

Each upright member 30 has an upper support arm 80 and a lower support arm 82 extending outwardly and upwardly from its upright member lower portion 54 or 72. Support arms 80 and 82 extend at right angles to lower portions 54 and 72 when viewed from the front or rear of the trailer, as best shown in FIG. 3. Lower support arms 80 extend from their associated upright member lower portion 50 or 70 at locations located in close proximity to frame 12. The upper support arms 80 extend from their associated upright member lower portions 54 or 72 at locations located approximately midway between frame 12 and the associated crosspoint 56 or 74.

Superstructure 14 also includes first brace member 90 and second brace member 92. First brace member connects forward pair 32 of upright members 30 at a location in close proximity to forward crosspoint 56 to rear frame member 24 at a position located in close proximity to the location where one of the aft pair 34 of upright members 30 is connected to rear frame member 24, as best shown in FIG. 1. Second brace member 92 connects aft pair 34 of upright members 30 at a location in close proximity to aft crosspoint 74 to front frame member 20 at a position located in close proximity to the location where one of the forward pair 32 of upright members 30 is connected to front frame member 20, as best shown in FIG. 1.

Pad means includes upper upright member pads 100 and lower upright member pads 102. The pad means further include support member pads 104. The pads 100, 102 and 104 cover substantially all of the lower portions 54 and 72 of upright members 30 and support members 80, for padding objects that are being supported by those members.

Figure 4:
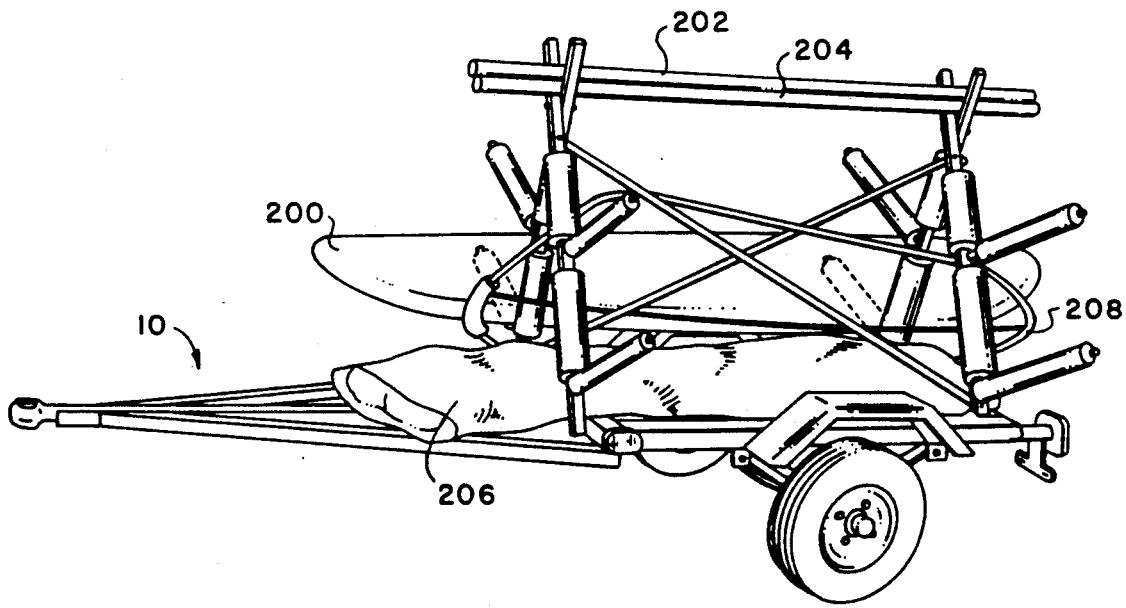
FIG. 4 is a perspective view of the trailer showing utilization of the trailer to support sailboarding equipment.

In operation, as best shown in FIG. 4, trailer 10 is particularly well-suited for transporting sailboarding equipment, such as sailboard 200, mast sections 204, sails 206 and boom 208. As many as eight sailboards can be transported on trailer 10, although only one sailboard is illustrated as being transported by trailer 10. The sailboard enthusiast will enjoy reduced packing time, because all of the sailboard equipment is transportable on trailer 10. The enthusiast will no longer get sand in his car trunk or damage to the car body from the heavy, awkward sailboards. In addition, with the sailboards securely stowed on the trailer 10, the enthusiast will not have to worry about the sailboards blowing off cartop carriers onto the highway. By carrying sails as shown in FIG. 4, the sails will quickly dry thereby prolonging their useful lives.

Whereas, the present invention has been described with respect to a specific embodiment thereof, it will be understood that various changes and modifications will be suggested to one skilled in the art, and it is intended to encompass such changes and modifications as fall within the scope of the appended claims.

I claim:

1. A trailer for elongated, generally flat objects, such as sailboards, comprising:
   a trailer base having at least two wheels;
   a superstructure above said base, said superstructure having a plurality of members constructed and arranged to support horizontally at least one of said objects;
   said superstructure including forward and aft pairs of upright members;
   said forward pair of upright members forming an open, forward triangle with said front frame member when viewed from the front or rear of said trailer, and said aft pair of upright members forming an open, aft triangle with said rear frame member when viewed from the front or rear of said trailer;
   with lower ends of said forward pair of upright members being connected to said front frame member at spaced locations thereon located substantially equal distances from a center line of said rectangular frame, lower portions of said forward pair of upright members extending inwardly and upwardly from said front frame member, with lower ends of said aft pair of upright members being connected to said rear frame member at spaced locations thereon located substantially equal distances from said center line of said rectangular frame, and lower portions of said aft pair of upright members extending inwardly and upwardly from said rear frame member;
   said forward pair of upright members crossing and being interconnected at a forward cross point located substantially directly above said center line of said rectangular frame, and said aft pair of upright members crossing and being interconnected at a aft cross point located substantially directly above said center line; and
   with upper portions of said forward pair of upright members extending outwardly and upwardly from said forward cross point to form a "V", and upper portions of said aft pair of upright members extending outwardly and upwardly from said aft cross point to form a "V".

2. The trailer of claim 1 with said lower and upper portions of said forward pair of upright members having a length ratio of approximately 3:1, and said lower and upper portions of said aft pair of upright members having a length ratio of approximately 3:1.

3. A trailer for elongated, generally flat objects, such as sailboards, comprising:
   a trailer base having at least two wheels;
   a superstructure above said base, said superstructure having a plurality of members constructed and arranged to support horizontally at least one of said objects;
   said superstructure including forward and aft pairs of upright members;
   said forward pair of upright members forming an open, forward triangle with said front frame member when viewed from the front or rear of said trailer, and said aft pair of upright members forming an open, aft triangle with said rear frame member when viewed from the front or rear of said trailer;
   with lower ends of said forward pair of upright members being connected to said front frame member at spaced locations thereon located substantially equal distances from a center line of said rectangular frame, lower portions of said forward pair of upright members extending inwardly and upwardly from said front frame member, with lower ends of said aft pair of upright members being connected to said rear frame member at spaced locations thereon located substantially equal distances from said center line of said rectangular frame, and lower portions of said at pair of upright members extending inwardly and upwardly from said rear frame member;
   said forward pair of upright members crossing and being interconnected at a forward cross point located substantially directly above said center line of said rectangular frame, and said aft pair of upright members crossing and being interconnected at a aft cross point located substantially directly above said center line; and
   with upper and lower support arms extending outwardly and upwardly from each said upright member lower portions at right angles thereto when viewed from the front or rear of said trailer.

4. The trailer of claim 3 with said support arms being coplanar with their associated upright member lower portions when viewed from the sides of said trailer.

5. The trailer of claim 4 with said lower support arms extending from their associated upright member lower portions at locations located in close proximity to said frame.

6. The tailer of claim 4 with said upper support arms extending from their associated upright member lower portions at locations located approximately midway between said frame and their associated said cross point.

7. A trailer for elongated, generally flat objects, such as sailboards, comprising:
   a trailer base having at least two wheels;
   a superstructure above said base, said superstructure having a plurality of members constructed and arranged to support horizontally at least one of said objects;
   said superstructure including forward and aft pairs of upright members;
   said forward pair of upright members forming an open, forward triangle with said front frame member when viewed from the front or rear of said trailer, and said aft pair of upright members forming an open, aft triangle with said rear frame member when viewed from the front or rear of said trailer;
   with lower ends of said forward pair of upright members being connected to said front frame member at spaced locations thereon located substantially equal distances from a center line of said rectangular frame, lower portions of said forward pair of upright members extending inwardly and upwardly from said front frame member, with lower ends of said aft pair of upright members being connected to said rear frame member at spaced locations thereon located substantially equal distances from said center line of said rectangular frame, and lower portions of said aft pair of upright members extending inwardly and upwardly from said rear frame member;

said forward pair of upright members crossing and being interconnected at a forward cross point located substantially directly above said center line of said rectangular frame, and said aft pair of upright members crossing and being interconnected at a aft cross point located substantially directly above said center line; and with first and second brace members, said first brace member connecting said forward pair of upright members at a location in close proximity to said forward cross point to said rear frame member at a position located in close proximity to said location where one of said aft pair of upright members is connected to said rear frame member, and said second brace member connecting said aft pair of upright members at a location in close proximity to said aft cross point to said front frame member at a potion located in close proximity to said location where one of said forward pair of upright members is connected to said front frame member.

8. The trailer of claim 3 with pad means covering substantially all of said lower portions of said upright members and said support members for padding objects supported thereby.

9. A trailer for elongated, generally flat objects, such as sailboards, comprising:

a trailer base having at least two wheels attached to a rectangular, planar frame, the frame including a front frame member, two spaced side frame members and a rear frame member, with a tongue extending forwardly from said front frame member, and with said wheels being located vertically below said side frame members and horizontally approximately midway between said front and rear frame members;

a superstructure above said frame, said superstructure including forward and aft pairs of linear, tubular, substantially identical upright members, said forward pair of upright members forming an open substantially isosceles triangle with said front frame member when viewed from the front or rear of said trailer, said triangle having base angles of approximately 65 degrees and an apex angle of approximately 55 degrees, said aft pair of upright members forming an open triangle with said rear frame member substantially congruent with said triangle formed by said forward pair of upright members and said front frame member, and said upright members extending at right angles to said side frame members when viewed from the sides of said trailer;

with lower ends of said forward pair of upright members being connected to said front frame member at spaced locations thereon located substantially equal distances from a center line of said rectangular frame, lower portions of said forward pair of upright members extending inwardly and upwardly from said front frame member, said forward pair of upright members crossing and being interconnected at a forward cross point located substantially directly above said center line of said rectangular frame, upper portions of said forward pair of upright members extending outwardly and upwardly from said forward cross point to form a "V", with said lower and upper portions of said forward pair of upright members having a length ratio of approximately 3:1;

with lower ends of said aft pair of upright members being connected to said rear frame member at spaced locations thereon located substantially equal distances from said center line of said rectangular frame, lower portions of said aft pair of upright members extending inwardly and upwardly from said rear frame member, said aft pair of upright members crossing and being interconnected at a aft cross point located substantially directly above said center line of said rectangular frame, upper portions of said aft pair of upright members extending outwardly and upwardly from said aft cross point to form a "V", with said lower and upper portions of said aft pair of upright members having a length ratio of approximately 3:1;

upper and lower support arms extending outwardly and upwardly from each said upright member lower portions at right angles thereto when viewed from the front or rear of said trailer, said support arms being coplanar with their associated upright member lower portions when viewed from the sides of said trailer, said lower support arms extending from their associated upright member lower portions at locations located in close proximity to said frame, and said upper support arms extending from their associated upright member lower portions at locations located approximately midway between said frame and their associated said cross point;

first and second brace members, said first brace member connecting said forward pair of upright members at a location in close proximity to said forward cross point to said rear frame member at a position located in close proximity to said location where one of said aft pair of upright members is connected to said rear frame member, and said second brace member connecting said aft pair of upright members at a location in close proximity to said aft cross point to said front frame member at a position located in close proximity to said location where one of said forward pair of upright members is connected to said front frame member; and pad means covering substantially all of said lower portions of said upright members and said support members for padding objects supported thereby.

* * * * *